(12) United States Patent
Katayama (10) Patent No.: US 8,780,231 B2
(45) Date of Patent: Jul. 15, 2014

(54) IMAGING APPARATUS AND ZOOM CONTROL METHOD

(75) Inventor: Atsushi Katayama, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 626 days.

(21) Appl. No.: 12/632,618

(22) Filed: Dec. 7, 2009

(65) Prior Publication Data

US 2010/0141800 A1  Jun. 10, 2010

(30) Foreign Application Priority Data

Dec. 9, 2008 (JP) ................................. 2008-312848

(51) Int. Cl.
*H04N 5/262* (2006.01)

(52) U.S. Cl.
USPC ........................................ 348/240.1; 382/190

(58) Field of Classification Search
CPC . H04N 5/2256; H04N 5/2354; H04N 5/2353; H04N 5/23209; H04N 5/23296; H04N 5/2628; H04N 5/23212; H04N 5/23293
USPC .................................................... 348/240.1
See application file for complete search history.

(56) References Cited

U.S. PATENT DOCUMENTS

| 4,203,671 A | 5/1980 | Takahashi et al. |
| 5,621,495 A * | 4/1997 | Yamamoto et al. ............. 396/89 |
| 2002/0133059 A1* | 9/2002 | Minami ........................ 600/168 |
| 2008/0211935 A1* | 9/2008 | Kyuma ....................... 348/240.1 |
| 2010/0129048 A1* | 5/2010 | Pitts et al. ....................... 386/52 |

FOREIGN PATENT DOCUMENTS

| JP | 52-156624 A | 12/1977 |
| JP | 4-346333 A | 12/1992 |
| JP | 8-063597 A | 3/1996 |
| JP | 2001-211373 A | 8/2001 |

* cited by examiner

*Primary Examiner* — Antoinette Spinks
(74) *Attorney, Agent, or Firm* — Carter, DeLuca, Farrell & Schmidt, LLP (57) ABSTRACT

An imaging apparatus calculates a depth of field, and when the calculated result is shallower than a set depth of field, the zoom operation at the telescopic side is switched to the electronic zoom. In addition, when face recognition may not be possible, the zoom is switched to the electronic zoom. Furthermore, when face recognition has become impossible, the optical zoom is returned to the wide angle side until faces can be recognized. When the number of faces that can be recognized has decreased, the optical zoom is returned to the wide angle side until the number of faces that can be recognized is restored. In addition, when subsequently carrying out zooming at the telescopic side, the zooming switches to the electronic zoom.

6 Claims, 10 Drawing Sheets

FIG. 11

IMAGING APPARATUS AND ZOOM CONTROL METHOD

BACKGROUND OF THE INVENTION

1. Field of the Invention

The present invention relates to an imaging apparatus that can photograph videos, and a zoom control method.

2. Description of the Related Art

In a single lens reflex digital camera, a depth of field priority mode (or an auto-depth priority AE mode or and Auto Depth mode or the like), which sets the imaging conditions such that the depth of field is deep during still photography, is incorporated into the product. In contrast, when video recording is performed using a single lens reflex digital camera, first, the live view is started, and the shutter is half-pressed to perform focusing on plural subjects at different distances. Subsequently, the shutter is completely pressed to start video recording. In addition, for example, Japanese Patent Laid-Open No. 2001-211373, discloses a digital camera that can carry out video photography in which a zoom range that enables obtaining a sufficient depth of field is set in a zoom drive unit that carries out optical zooming.

However, in a conventional digital single lens reflex camera, when the optical zoom is operated at the telescopic side after starting the video recording, only the main subject will be in focus, whereas any subject at a distance differing from that of the main subject will not be in focus because the depth of field is shallow. They will be recorded in the video out of focus. In addition, face recognition is difficult because the depth of field is shallow.

SUMMARY OF THE INVENTION

The present invention provides an imaging apparatus and a zoom control method in which subjects are not readily recorded out of focus even in the case in which the zooming is carried out at the telescopic side when carrying out video recording.

One aspect of the present invention is an imaging apparatus that includes an imaging unit configured to capture a video of a subject image through a lens barrel, an optical zoom unit configured to move at least a portion of the lenses that are included in the lens barrel and changes the angular field of the subject image that can be captured by the imaging unit, an electronic zoom unit configured to change the photographic range of the photographic image that has been obtained by the imaging unit by image processing, a depth of field calculating unit configured to calculate the depth of field of an image that has been obtained through the lens barrel, and a control unit configured to switch between the optical zoom unit and the electronic zoom unit according to the depth of field that has been calculated by the depth of field calculating unit.

Further features of the present invention will become apparent from the following description of exemplary embodiments with reference to the attached drawings.

DESCRIPTION OF THE EMBODIMENTS

Hereinafter, embodiments of the present invention will be explained with reference to the figures. Note that each of the figures shown below is shown schematically, and the size and shape of the parts may be suitably exaggerated in order to facilitate understanding. In addition, although the following explanations may be made with specific numerical values, structures, and operations and the like, these can be suitably modified.

Figure 1:
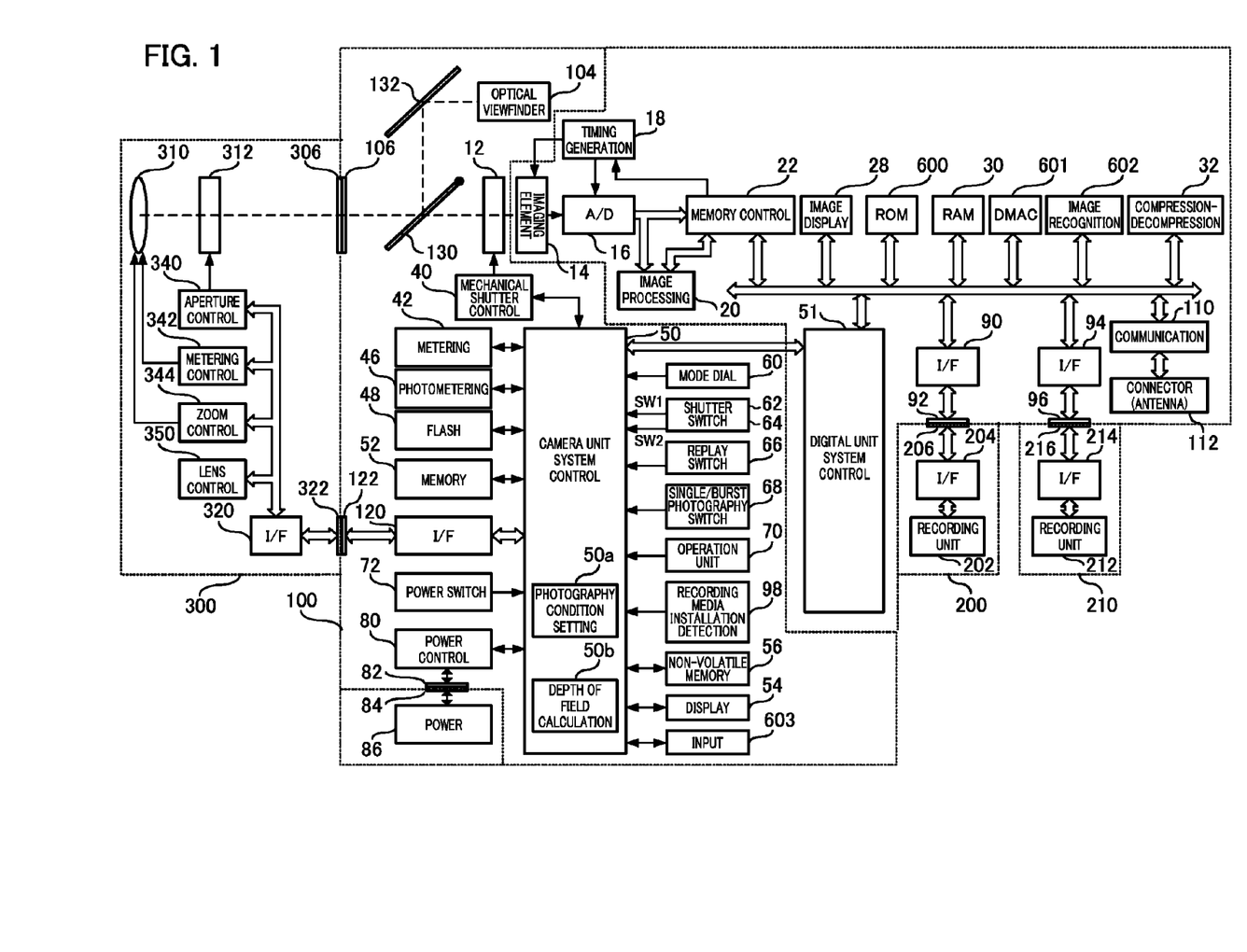
FIG. 1 is a drawing that shows the structure of a first embodiment of the imaging apparatus that uses the zoom control method according to the present invention.

A first embodiment is described as follows. FIG. 1 is a drawing that shows a configuration of the first embodiment of the imaging apparatus that uses the zoom control method according to the present invention. The imaging apparatus 100 is a digital single lens reflex camera that can photograph videos, and a subject image that is obtained by the lens 310, which is included in a lens barrel 300, is photographed by forming an image on the photographic plane of the imaging element 14. The mechanical shutter 12 carries out an opening and closing operation to control the amount of light exposure of the imaging element 14. The imaging element 14 is a photoelectric conversion unit configured to convert an optical image into an electric signal. The imaging element 14 of the present embodiment uses a CCD (charge coupled device) image sensor. Note that a CMOS (complementary metal oxide semiconductor) image sensor or another type of image sensor may be used as the imaging element.

The light beam that is incident to the lens 310 arrives, due to the single lens reflex configuration, at a position on the mirror 130 via the aperture 312 and the lens mounts 306 and 106. In addition, when the mirror 130 is raised or the mirror 130 is a semitransparent mirror 130, the light transits therethrough, and the light beam, which is incident to the lens 310 because the mechanical shutter 12 is open, can form an image on the imaging element 14 to serve as an optical image. An A/D converter 16 converts the analog signal output of the imaging element 14 to a digital signal. A timing generating unit 18 supplies electronic shutter control signals and clock signals to the imaging element 14, and supplies clock signals and control signals to the A/C converter 16. In addition, the timing generating unit 18 is controlled by the memory control unit 22 and the digital unit system control circuit 51.

The digital unit system control circuit 51 can communicate with the camera unit system control circuit 50, and controls the digital unit of the imaging apparatus 100. This digital unit system control circuit 51 controls the data display of the image display unit 28, and it is notified by the camera unit system control circuit 50 about whether photometry timing is being performed. In addition, the digital unit system control circuit 51 receives notification from an image processing unit 20 about whether image processing is being performed, and stores the state thereof in the RAM 30. Furthermore, the digital unit system control circuit 51 stores, in the RAM 30, whether the image display unit 28 is displaying data.

The camera unit system control circuit 50 carries out the optical zoom operation by controlling the zoom control unit 344, and in the case in which the depth of field has become shallower than that set by the operating unit 70, the digital unit system control circuit 51 commands the image processing unit 20 to carry out an electronic zoom operation. In addition, in the case in which the optical zoom operation is being carried out and face recognition by the image recognition unit 602 may not be possible, the digital unit system control circuit 51 commands the image processing unit 20 to carry out an electronic zoom operation.

Furthermore, in the case in which an optical zoom operation is being carried out and the image recognition unit 602 cannot carry out face recognition or the number of faces that can be recognized by the image recognition unit 620 decreases, the digital unit system control circuit 51 commands the camera unit system control circuit 50 to control the zoom control unit 344 to return the optical zoom to the wide angle side. This zoom operation at this wide angle side is carried out until face recognition is possible or the number of faces that can be recognized returns to the original number. In the case in which subsequently further optical zooming is to be carried out, the digital unit system control circuit 51 commands the image processing unit 20 to carry out electronic zoom operation.

The image processing unit 20 carries out predetermined pixel interpolation processing and color conversion processing on the data from the A/D converter 16 or data from the memory control unit 22. In addition, the image processing unit 20 provides notification to the digital unit system control circuit 51 about whether image processing is being performed. Furthermore, the image processing unit 20 carries out predetermined calculation processing by using the photographic image data. Based on the calculated results obtained by this calculation processing, the camera unit system control circuit 50 carries out control of an imaging conditions setting unit 50a and the ranging unit 42. For example, the camera unit system control unit 50 can carry out imaging plane autofocus processing, AE (automatic exposure) processing, and EF (flash lighting modulation) processing. Furthermore, the image processing unit 20 carries out predetermined calculation processing using the photographic image data, and based on the calculated result that has been obtained, also carries out TTL-type AWB (auto-wide angle balance) processing. In addition, this image processing unit 20 also carries out TVAF (contrast detection auto-focus).

In the case in which the image processing unit 20 is set to the live view mode, the image data that has been captured by the imaging element 14 is displayed in the image display 28 in real time. In addition, during the video recording, in the case in which the digital unit system control circuit 51 determines that electronic zooming is to be carried out, the electronic zoom operation, which crops (cuts off) the necessary photographic range from the photographic image using the image processing unit 20, is carried out. The memory control unit 22 controls the A/D converter 16, the timing generating unit 18, the image processing unit 20, the RAM 30, and a compression-decompression portion 32. The data that has been output by the A/D converter 16 is written to the RAM 30 via the image processing unit 20 and the memory control unit 22, or via the memory control unit 22 directly from the A/D converter 16.

The image display unit 28 includes a TFT-LCD (Thin Film Transistor-Liquid Crystal Display) or the like, includes a video controller, and displays menus and photographic image data and the like. In addition, the image display unit 28 can freely turn the display ON and OFF according to instructions from the digital unit system control circuit 51. When the display is turned OFF, the power consumption of the imaging apparatus 100 can be significantly reduced. This image display unit 28 replays both photographed still images and recorded video. In addition, the image display unit 28 also displays the settings (the display in FIG. 8 and FIG. 9) for the depth of field that triggers the electronic zooming.

The RAM 30 is a storage unit that stores the photographed still images and video images, and is provided with sufficient memory capacity for storing a predetermined number of still images and a predetermined amount of time of video images. Thereby, in burst photography or panorama photography, in which plural still images are continuously shot, high speed and large capacity image writing can be carried out in the storage unit. In addition, under the control of the digital unit system control circuit 51, photographic image data or image data that is called from the recording media 200 and 210 is stored by the RAM 30. A portion of this RAM 30 is used as a cache area for the digital unit system control circuit 51. Furthermore, the RAM 30 can also be used as a working area for the camera unit system control circuit 50.

The compression-decompression unit 32 carries out the compression and decompression of the image data by using ADCT (Adaptive Discrete Cosine Transform) and the like. The compression-decompression unit 32 carries out the compression processing and decompression processing by reading the image that has been stored in the RAM 30, and writing the data whose processing has been completed to the RAM 30. In addition, the compression and decompression unit 32 also performs the compression processing on video images. The mechanical shutter control portion 40 controls the mechanical shutter 12 in cooperation with the aperture control unit 340 that controls the aperture 312, to conform to the imaging conditions that have been set by the photographic condition setting unit 51a based on the photometering information from photometering unit 46.

A ranging unit 42 carries out AF (auto focus) processing. A light beam that is incident to the lens 310 is incident to an AF sensor (not illustrated) of the ranging unit 42 via the aperture 312, the lens mounts 306 and 106, the mirror 130, and the ranging sub-mirror (not illustrated) due to the single reflex lens configuration. The ranging unit 42 measures the focusing conditions of the image that has been formed as an optical image incident to the AF sensor. The photometering unit 46 carries out AE (auto-exposure) processing. The light beam that is incident to the lens 310 is incident to a photometering sensor (not illustrated) of the photometering unit 46 via the aperture 312, the lens mounts 306 and 106, the mirrors 130 and 132, and a photometering lens (not illustrated) due to the single lens reflex configuration. The photometering unit 46 measures the luminance of the image that has formed as an optical image incident to the photometering sensor. In addition, the photometering unit 46 includes an EF (flash lighting modulation) processing function that cooperates with flash 48.

Note that exposure control and AF (autofocus) control are possible using a video TTL method. In this case, based on the calculated results, in which the photographic image data from the image element 14 has been calculated by the image processing unit 20, the camera unit system control circuit 50 carries out control of the mechanical shutter control unit 40, the aperture control unit 340, and the ranging control unit 342.

The flash 48 is a flash emitting unit that emits light in order to augment the amount of light in a dark location and the like, and the light projection function of the AF auxiliary light also has a flash lighting modulation function.

The camera unit system control circuit 50 controls the camera portion of the imaging apparatus 100, and notifies the digital unit system control circuit 51 about whether or not the photometering timer is in operation. The camera unit system control circuit 50 communicates with the lens control unit 350 to obtain the identification information for the lens, and calculates a permissible circle of confusion. In addition, the camera unit system control circuit 50 communicates with the lens control unit 350 to obtain the focal distance of the lens and the distance to the subject (the imaging distance). The camera unit system control circuit 50 includes an imaging conditions setting unit 50a and a subject field of distance calculating unit 50b.

The imaging conditions setting unit 50a sets the aperture during photography, the photographic sensitivity, the shutter speed, and the electronic shutter speed during video photography based on the luminance information for the subject that has been obtained from the imaging element by using the photometering unit 46 or a video TTL method. In addition to the circle of confusion, the focal distance of the lens, and the photographic distance that are obtained as described above, the depth of field unit 50 calculates the depth of field using the aperture value set by the operating unit 70 and the aperture value that has been set by the photographic conditions setting unit 50b. The depth of field calculating unit 50b notifies the digital unit system control circuit 51 when the depth of field that has been obtained by the calculation is shallower than a preset depth of field.

Figure 2:
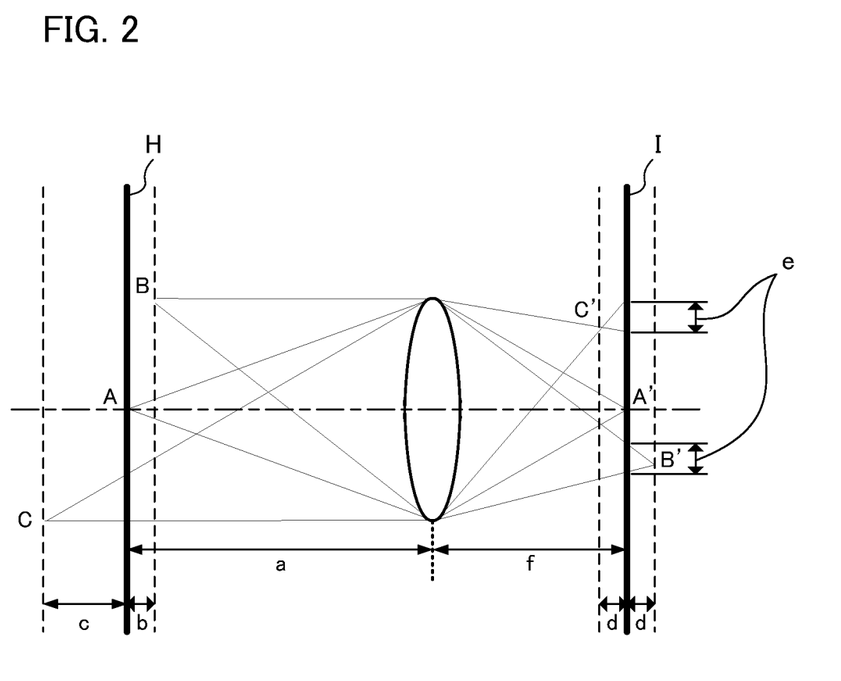
FIG. 2 is a drawing for explaining the depth of field that is calculated by the depth of field calculating unit 50b.

FIG. 2 is a drawing for explaining the depth of field that is calculated by the depth of field calculating unit 50b. In FIG. 2, the forward depth of field b is the depth of field at the front side of the subject plane H, and the rearward depth of field c is the depth of field at the back of the subject plane H. Note that the focal distance is the range in front of and behind the imaging element plane I, and this is shown by 2d in the example that is shown in FIG. 2.

The forward depth of field b and the rearward depth of field c can be found as follows:

Forward depth of field $b = e \cdot F \cdot a \cdot a / (f \cdot f + e \cdot F \cdot a)$ Rearward depth of field $c = e \cdot F \cdot a \cdot a / (f \cdot f - e \cdot F \cdot a)$ Here, e is the permitted circle of confusion, F is the F number (aperture number), a is the distance to the subject, and f is the focal distance of the lens. Thus, within this range of the depth of field (b+c), the subject will be considered to be in focus.

The memory 52 stores the constants, variables, and programs and the like for the operation of the camera unit system control circuit 50. A display unit 54 displays the operational state and the messages and the like by using characters, images, audio and the like depending on the execution of the programs in the camera unit system control circuit 50. The display unit 54 is disposed singularly or in plurality at a position where the vicinity of the operating portion of the imaging apparatus 100 is easily visible, and, for example, is structured by a combination of an LCD (Liquid Crystal Display), LED (Light Emitting Diode), a sound emitting element or the like. In addition, a portion of the functions of the display unit 54 is arranged inside the optical viewfinder 104.

The display content of the display unit that can be displayed on the LCD and the like may include, for example, a single shot/burst photography display, the self-time display, the compression ratio display, the recording pixel number display, the recorded number of photographs display, the remaining photograph number display, the shutter speed display, the aperture value display, and the exposure compensation display and the like. In addition, the flash display, red-eye elimination display, the macro photography display, sound setting display, the clock battery state of charge display, the battery state of charge display, the error display, and information display by using numbers having plural digits are also displayed on the LCD or the like. Furthermore, the recording media 200 and 210 installation state display, the lens barrel 300 installation state display, the communication I/F operation display, the date and time display, and the state of connection with an external computer and the like can also be displayed in the LCD or the like.

In contrast, the display content of the display unit 54 that can be displayed in the optical viewfinder 104 may include, for example, the focus display, the photography preparation completion display, the shake warning display, the flash charging display, and the flash charging complete display. In addition, the shutter speed display, the aperture value display, the exposure compensation display, and the recording media writing operation display may be displayed in the optical viewfinder 104. Furthermore, the display content of the display unit 54 that can be displayed in the LED or the like may include, for example, the focus display, the photography preparation completion display, the shake warning display, the flash charging display, and the flash charging complete display. In addition, the recording media writing operation display, the macro photography setting notification display, and the secondary battery state of charge and the like are displayed by an LED or the like.

In addition, the display content of the display unit 54 that can be displayed using lamps and the like may include, for example, the self-timer indication lamp. This self-timer indication lamp may also be used as an AF auxiliary light. The non-volatile memory 56 is a non-volatile storage unit configured to be electrically erasable and recordable. An EEPROM (Electrically Erasable Programmable ROM), for example, may be used for the non-volatile memory 56.

The mode dial 60, the shutter switch 62 (SW1), the shutter switch (SW2) 64, the replay switch 66, the single/burst photography switch 68, and the operation unit 70 are operational unit for the camera unit system control circuit 50 for inputting various types of operational commands. These are configured by combining, singularly or in plurality, a switch and dial, a touch panel, pointing by line-of-sight detection, and a voice recognition apparatus and the like.

The mode dial 60 can switch and set the various functional photography modes, such as the automatic photography mode, the program photography mode, the shutter speed priority photography mode, the aperture priority photography mode, the manual photography mode, and the depth of field priority (depth) photography mode. In addition, the mode dial 60 also switches and sets the various functional photography modes, such as the portrait photography mode, the landscape photography mode, the close-up photography mode, sports photography mode, night photography mode, and panorama photography mode. The shutter switch 62 is a switch (SW1) that is turned on when half-pressed during the operation of the shutter button (not illustrated). By turning the shutter switch 62 (SW1) ON, the camera unit system control circuit 50 commands the start of operations such as the AF (autofocus) processing, AE (auto-exposure) processing, AWB (auto-white balance) processing, and EF (flash lighting modulation) processing and the like.

The shutter switch 64 is a switch (SW2) that is turned ON when completely pressed to terminate the operation of the shutter button (not illustrated). By turning the shutter switch 64 (SW2) ON, the camera unit system control circuit 50 commands the start of a processing sequence that includes the exposure processing, the image processing, and the recording processing. In this exposure processing, a signal that has been read from the imaging element 14 is written as image data to the RAM 30 via the A/D converter 16 and the memory control unit 22. In addition, in the development processing, calculations are performed in the image processing unit 20 and the memory control unit 22. Furthermore, in the recording processing, the image data is read from the RAM 30, compression is carried out by the compression-decompression unit 32, and the image data is written to the recording media 200 and 210. In addition, the start of video recording is also commanded by turning the shutter switch 640N.

The replay switch 66 is operated when commanding the start of the replay operation, in which a photographic image or video is read from the RAM 30 or the recording media 200 and 210, and then displayed by the image display unit 28. The single/burst switch 68 can set the single mode, which moves to standby mode after a single frame is photographed when the shutter switch 64 (SW2) has been pressed, and a burst mode, which performs photography continuously while the shutter switch 64 (SW2) is pressed.

The operation unit 70 includes various types of buttons and touch panels and the like, and has a menu button, a set button for starting a live view, a photography switching key for switching between still photography and video recording, and a depth of field priority button that causes depth of field priority recording during video photography. In addition, on the telephoto side, the operation unit 70 includes a zoom key that zooms to the wide-angle side, an image recognition start button that starts image recognition, a macro photography button, a multi-screen replay page change button, a flash setting button, and a self-timer switching button. Furthermore, the operating unit 70 includes a menu move + (plus) button, the menu move − (minus) button, the replay image move + (plus) button, the replay image − (minus) button, the photograph screen quality selection button, the exposure compensation button, and the date/time setting button.

Furthermore, the operation unit 70 includes a select/switch button that sets the selection and switching of various functions when executing imaging or replaying of the panorama mode and the like, and a determination/execution button that sets the determination and execution of various functions when executing imaging or replaying of the panorama mode and the like. Furthermore, the operation unit 70 includes an image display ON/OFF switch that sets the image display portion 28 to ON or OFF, and a quick preview ON/OFF switch that sets the quick view function that automatically replays photographic image data immediately after having been photographed. Furthermore, the operation unit 70 includes a compression mode switch that selects the compression ratio for JPEG compression or selects the RAW mode that directly digitalizes and records a signal of the imaging element, and a replay switch that sets various function modes such as the replay mode, the multi-screen replay/erase mode, and the PC connection mode and the like.

Furthermore, the operation unit 70 includes an AF mode setting switch that sets a one-shot AF mode and a servo AF mode. The one-shot AF mode is a mode in which the AF operation is started when the shutter switch 62 (SW1) is pressed, and once in focus, this focus state continues to be maintained. The servo AF mode is a mode in which the auto focus operation continues while the shutter switch 62 (SW1) is being pressed. In addition, each of the functions of the plus buttons and the minus buttons described above further facilitate the ease of selection of numerical values and functions by being provided with a rotating dial switch. Furthermore, the setting of the depth of field priority mode for video photography and the setting of the depth of field mode for carrying out electronic zoom when equal to or less than a value of the depth of field are also carried out by the operation unit 70. The power switch 27 can switch and set each of the modes for power ON and power OFF of the imaging apparatus 100. In addition, switching and setting can be carried out in conformity to the settings for the power ON and power OFF for a variety of attachments such as the lens barrel 300 that is connected to the photographic apparatus 100, an external flash, and the recording media 200 and 210 and the like.

The power source control unit 80 is formed by a battery detecting circuit, and a switching circuit that switches between a DC-DC converter and the conducting block and the like. The power source control unit 80 carries out the detection of whether or not a battery has been installed, the type of battery, and the state of charge, controls the DC-DC converter based on the detected results and the commands of the camera unit system control circuit 50, and provides necessary voltage to each of the units, including the recording media, for a necessary period of time. The connectors 82 and 84 connect the inside of the imaging apparatus 100 and the power source 86, which is housed in a battery housing unit, or an AC adaptor or the like. The power source 86 may be a primary battery such an alkaline battery or a lithium battery or the like, or a secondary battery such as a NiCd battery, a NiMH battery, or a Li battery or the like, or an AC adaptor or the like. The interfaces 90 and 94 mediate the connection between the memory media 200 and 210 such as a memory card and a hard disk and the like. The connectors 92 and 96 are connected to the recording media 200 and 210, such as a memory card or hard disc or the like. The recording media installation detecting unit 98 detects whether at least one recording media 200 or 210 of the connector 92 and 96 is installed.

Note that in the present embodiment, an explanation is provided in which the interface and connector in which the recording media are installed form two systems. This is not limiting, and the interface and connector in which the recording media are installed may be configured to provide either single or plural systems. In addition, a configuration may be used that is provided with a combination of an interface and connector that have different technical standards. An interface or a connector that conforms to standards, such as a PCMCIA card and Compact Flash (trademark) card, can be used as the interface and connector.

Furthermore, when the interfaces 90 and 94 and the connectors 92 and 96 are structured by using devices that conform to standards, such as a PCMCIA card or a Compact Flash (registered trademark) card, they can be used for data communication. Specifically, by connecting various communication cards to this portion, image data and control information that is associated with the image data can be transferred between other computers and peripheral devices such as printers and the like. A communication card such as LAN card, modem card, USB card, IEEE 1394 card, P1284 card, SCSI card, or PHS or the like can be used as the communication card.

The light beam incident to the lens 310 is guided by the single lens reflex configuration via the aperture 312, the lens mounts 306 and 106, and the mirrors 130 and 132, and the optical viewfinder 104 can thereby display the formed image as an optical image. Thereby, photography can be carried out by using only the optical viewfinder 104, without using the electronic viewfinder function of the image display unit 28. In addition, functions for a portion of the display unit 54, such as the focus display, the shake warning display, the flash charge display, the shutter speed display, the aperture value display, and the exposure compensation display are arranged in the optical viewfinder 104.

The communication portion 110 connects the imaging apparatus 100 to a personal computer. The communication unit 110 of the present embodiment uses IEEE 1394. The imaging apparatus 100 transmits information that is stored in the RAM 30 or the ROM 600 and the recording media 200 and 210 to a personal computer that is provided externally via the communication unit 110, or alternatively, receives various types of information thereby. The communication unit 110 is used in particular to carry out transmission and reception of captured data and image data. In addition, this communication unit 110 may be configured by various types of communication unit such as RS232C, USB, USB2, P1284, SCSI, modem, LAN, or wireless communication or the like.

The connector 112 connects the imaging apparatus 100 to other devices by using the communication unit 110. Note that in the case of wireless communication, an antenna may be used instead of a connector 112. The interface 120 connects the imaging apparatus 100 to the lens barrel 300 inside the lens mount 106. The connector 122 electrically connects the imaging apparatus 100 to the lens barrel 300. The connector 122 sends control signals, state signals, and data signals and the like between the photography apparatus 100 and the lens barrel 300, and is also provided with the function of supplying current for various voltages. In addition, the connector 122 may have a structure in which optical communication or voice communication or the like are transmitted without electronic communication. The mirrors 130 and 132 can guide the light beam incident to the lens 310 to the optical viewfinder 104 by the single lens reflex configuration. Note that the mirror 132 may be formed by a quick-return mirror or by a semitransparent mirror.

The recording medium 200 is a memory card or a hard disk or the like, and records the image or video that has been photographed. The recording medium 200 is provided with a recording unit 202 that is formed by a semiconductor memory or magnetic disk or the like; an interface 204 with the imaging apparatus 100; and a connector 206 that connects to the imaging apparatus 100. The recording medium 210 is a memory card or a hard disk or the like, and records the image or video that has been photographed. The recording medium 210 is provided with a recording unit 212 that is formed by a semiconductor memory or a magnetic disk or the like, an interface 214 with the imaging apparatus 100, and a connector 216 that connects to the imaging apparatus 100.

The lens barrel 300 is an interchangeable lens that is freely detachable from the imaging apparatus 100. The lens mount 306 mechanically links the lens barrel 300 to the imaging apparatus 100. Various functions that electrically connect the lens barrel 300 to the imaging apparatus 100 are included in the lens mount 306. The lens 310 includes plural lens groups, and is a photographic optical system that enables optical zoom that changes the angular field of a subject image that can be photographed by moving at least a portion of the lens group in a direction along the optical axis. In addition, the lens barrel 300 of the present embodiment is provided with a zoom motor that generates the drive power that carries out the optical zooming by moving the lens group. The aperture 312 is an iris aperture in which the aperture diameter changes to adjust the amount of light that passes through the lens 310. The interface 320 connects the lens barrel 300 to the imaging apparatus 100 in the lens mount 306.

The connector 322 electrically connects the lens barrel 300 and the imaging apparatus 100. The connector 322 sends control signals, state signals, and data signals and the like between the imaging apparatus 100 and the lens barrel 300, and also provides the function of supplying the current for various voltages. In addition, the connector 322 may be a structure in which optical communication and voice communication and the like are transmitted without electronic communication. The aperture control unit controls the aperture 312 in cooperation with the mechanical shutter control unit 40 that controls the mechanical shutter 12 to conform to the imaging conditions that have been set by the imaging condition setting unit 50a based on the photometering information from the photometering unit 46. The ranging control unit 342 controls the focusing of the lens 310. The zoom control unit 344 controls the zooming of the lens 310.

The lens control unit 350 controls the entire lens barrel 300. The lens control unit 350 also functions as a nonvolatile memory that stores constants and variables for operations, identification information for unique numbers for the memory that stores programs and the like and lens barrel 300, management information, functional information such as open shutter values, minimum shutter values, and focal distance and the like, and stores present and past setting values. When identification information for the lens, the distance to the subject, and information about the focal distance of the photographic lens have been found in order to calculate the depth of field by the camera unit system control circuit 50, the lens control unit 350 returns this information.

The ROM 600 is a non-volatile memory that can electrically erase and record, and even when the power source of the imaging apparatus 100 is turned OFF, the memory content is maintained. The ROM 600 stores in particular the programs that control the operation of the imaging apparatus 100, and it is used to store the photography mode, the photographic information, and various parameters. The DMA controller 601 carries out DMA transfer of the display data prepared on the RAM 30 to the image display unit 28 when the image display unit 28 is displaying data. The data that has been transferred by this DMA transfer is displayed in the image display unit 28.

The image recognition unit 602 carries out predetermined image recognition processing on data from the image processing unit 20 and from the memory control unit 22. In addition, the image recognition unit 602 carries out the processing of the activity recognition of the image recognition object. The image recognition unit 602 also carries out the processing for face recognition. Face recognition is a technology that detects whether there is a face in the image, and the position and size and the like thereof. Many means of face recognition have already been realized as face recognition technology. For example, as a means configured to extract a human face from a photographic image, Japanese Patent Laid-Open No. 52-156624, proposes a method in which skin color data is extracted from the original image, and the cluster of photometric points that are determined to be within the skin color range are treated as a face. In addition, Japanese Patent Laid-Open No. 4-346333, proposes a method in which photometric data is converted to a hue and chrominance, and the face area is determined by producing and analyzing a two dimensional histogram thereof. Furthermore, Japanese Patent Laid-Open No. 8-063597, proposes a method in which a face candidate area that corresponds to the profile of a human face is extracted, and the face area is determined based on the characteristic quantities within this area. In the implementation of the present invention, any method of face detection may be used. In addition, the image recognition unit 602 carries out smiling face detection, crying face detection, and angry face detection and the like. In the present embodiment, the input unit 603 is a touch panel.

Figure 3:
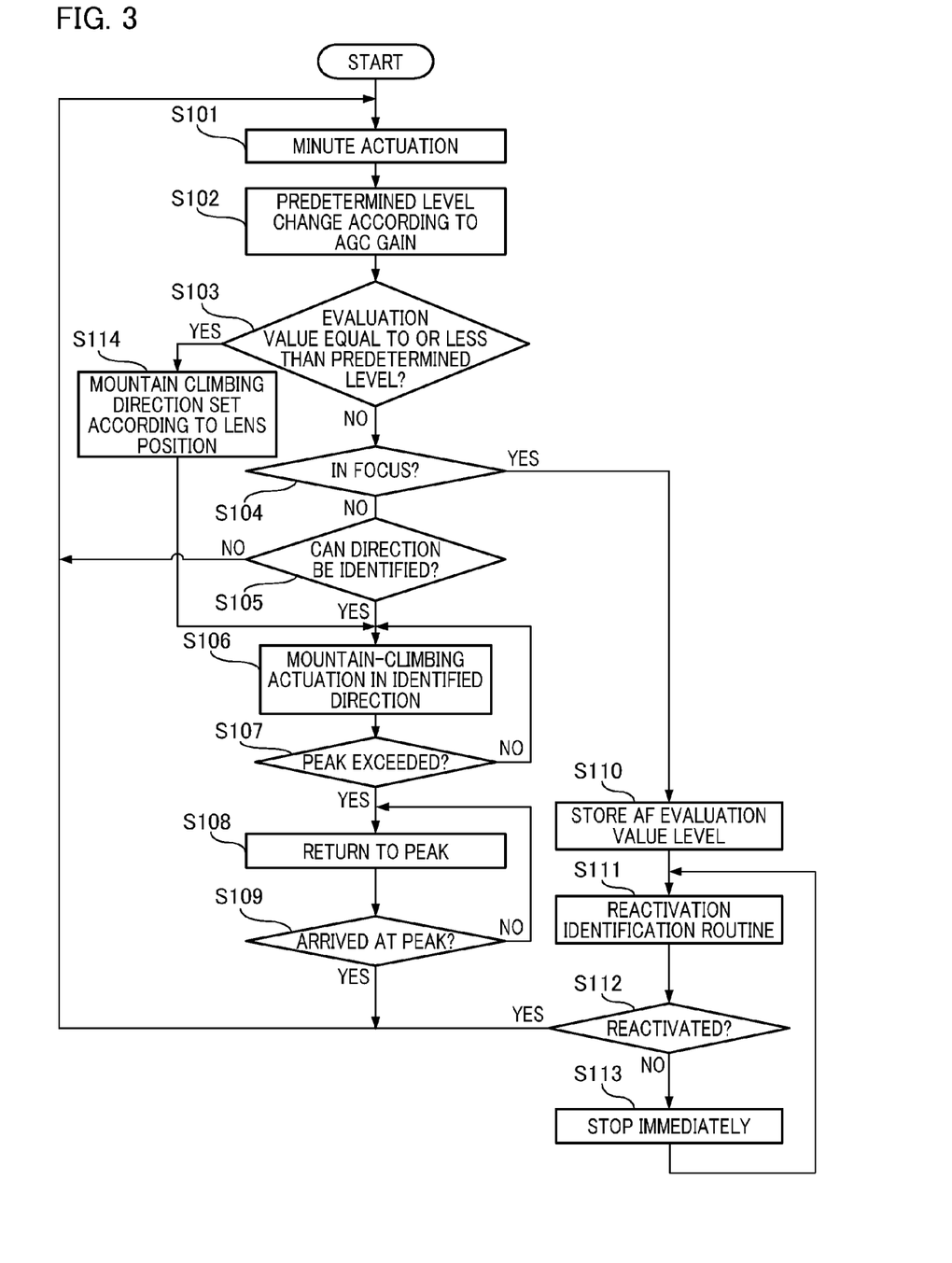
FIG. 3 is a flowchart that shows the TVAF operation in the first embodiment.

Next, the TVAF that is used in the present embodiment will be explained. FIG. 3 is a flowchart that shows the operation of the TVAF in the first embodiment. Note that, including the one in FIG. 3, each of the flowcharts shown below is for explaining the principal operating components of the present invention. Therefore, we do not present flowcharts that correspond to every condition of the imaging apparatus, and some conditions are appropriately omitted. First, when directed to carry out TVAF by the operation unit 70, the camera unit system control circuit 50 operates the lens control unit 350. The camera unit system control circuit 50 reads the AF evaluation value from the image processing unit 20 while the lens undergoes a minute actuation operation. In addition, the digital unit system control circuit 51 determines whether the lens 310 is currently in focus or out of focus, and performs focusing when out of focus (step 101, below, "step" is indicted by "S").

Next, the predetermined level used in S103 is changed depending on the gain of the present AGC from the AGC (automatic gain control) of the timing generating unit 18 (S102). This is set to become larger as the gain of the AGC of the timing generating unit 18 increases, using as a standard the value when the AGC of the timing generating unit 18 is turned OFF. Next, the digital unit system control circuit 51 identifies whether the AF evaluation value is equal to or less than a predetermined level (S103). In addition, if the AF evaluation value is equal to or less than a predetermined level, the direction identification using minute actuation operations is stopped, and the mountain-climbing direction is set based on the present position of the lens 310. Subsequently, in S106, the lens 310 is driven by mountain-climbing in a direction that has been set in S114.

In contrast, in S103, if the AF evaluation value is equal to or less than a predetermined value, whether the lens is presently in focus or not is identified based on the results of the minute actuation operations (S104). In addition, in the case in which the lens 310 is in focus, the movement of the lens 310 is stopped, and the processing proceeds to the reactivation monitoring processing routine (S110). In the case in which the lens 310 is not in focus, the direction in which the focal point is located is identified based on the result of the minute actuation operations (S105), and in the case in which this direction cannot be determined, the processing returns to S101. In addition, in the case in which the direction can be identified in S105, mountain-climbing actuation operations are executed in the identified direction (S106).

Next, the digital unit system control circuit 51 determines whether the focal point, that is, the peak of the AF evaluation signal, has been passed (S107). If the focal point has not been passed, the processing returns to S106 and continues the mountain-climbing drive operation. If the focal point has been passed, the lens 310 is returned to the peak (S108). However, during the operation in which the lens 310 is returned to the peak, there are cases in which the subject changes due to panning and the like. Thus, if the lens 310 has climbed to the peak, it is determined whether the lens 310 has reached the peak in order to determine whether the present location is the actual peak, that is, the focal point (S109). Additionally, in the case in which the lens 310 has not reached the peak, the processing returns to S108. In addition, in S109, in the case in which the lens 310 has reached the peak, the processing returns to S101.

In contrast, while in the present focus state in S104, the AF evaluation value level during focusing is stored (S110). Next, the reactivation identification routine is executed (S111). When in the present focus position, this reactivation identification routine is a process that determines whether the AF evaluation value level has changed in comparison to a level that has been stored in S110 during focusing. For example, if the AF evaluation value level has changed to become equal to or greater than a predetermined level with respect to a stored level, it is assumed that the subject has changed due to panning and the like, and it is identified that "reactivation has occurred." If there is a change that is less than a predetermined level, it is assumed that there has been no change of subject, and it is identified that "reactivation has not occurred". Whether reactivation has occurred is identified according to such identification criteria. In addition, in the case in which it has been identified that "reactivation has not occurred," after immediately stopping the movement of the lens (S113), the processing returns to S111, and the reactivation monitoring processing is carried out again. In contrast, in S112, in the case in which it has been identified that "reactivation has occurred," the processing returns to step S101, the minute actuation operations are carried out again, and the focus identification and direction identification are carried out. By repeating the above operations, the lens 310 is operated to continuously maintain the focus, and TVAF is carried out.

Figure 4:
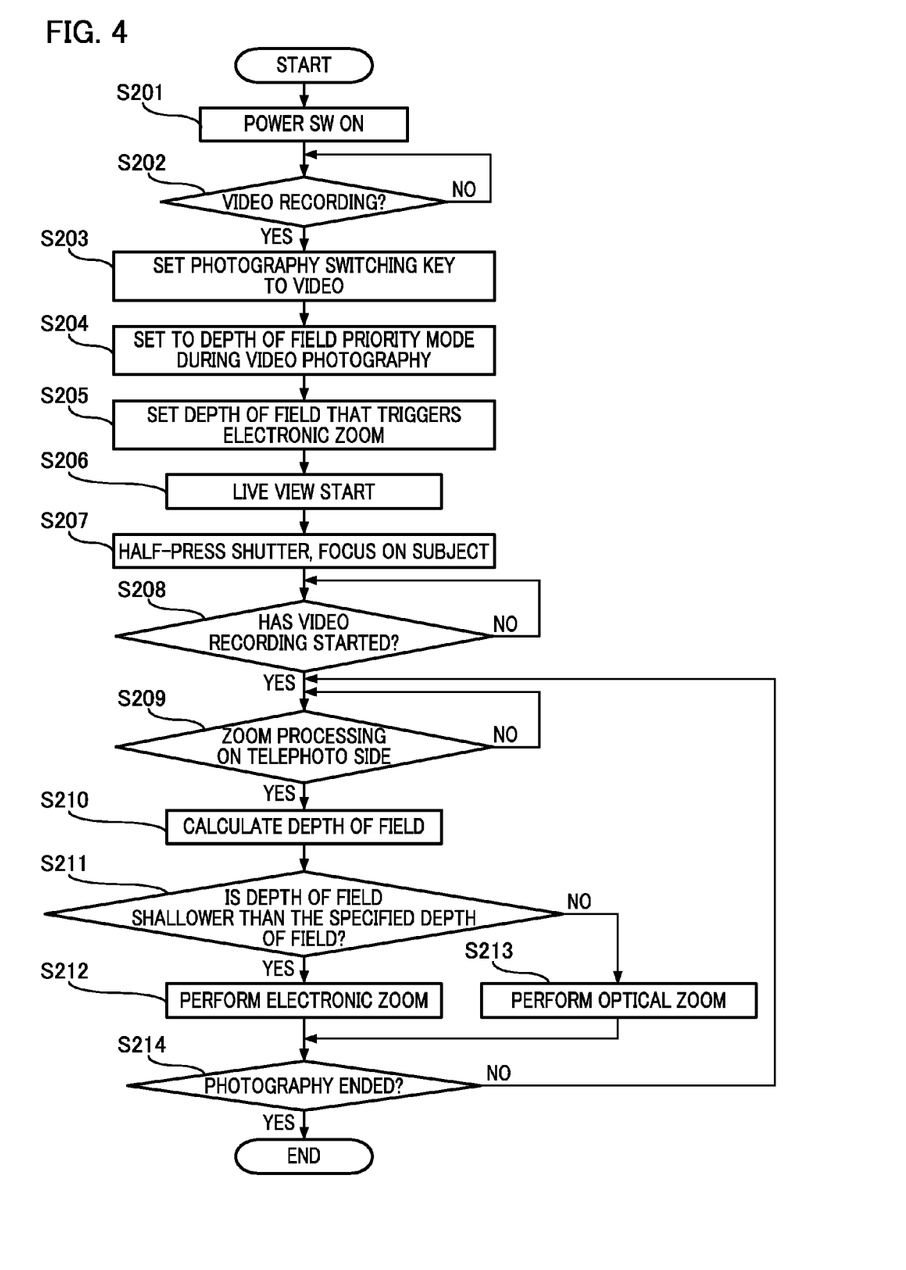
FIG. 4 is a flowchart that shows the operation of an imaging apparatus 100 of the first embodiment.

Next, the operation of the imaging apparatus 100 will be explained. FIG. 4 is a flowchart that shows the operation of the imaging apparatus 100 of the first embodiment. First, in S201, the power switch 72 is turned ON in order to use the imaging apparatus 100. In S202, it is determined whether video recording is being carried out, and in the case in which video recording is being carried out, the processing proceeds to S204. In the case in which video recording is not being carried out, the determination of step S203 is repeated. In S203, the photography switching key of the operation unit 70 for still photography and video photography is switched to video photography. In S204, the depth of field priority button of the operation unit 70 is pressed, and the imaging apparatus 100 is set to the depth of field priority mode during video photography. In S205, the depth of field that triggers the electronic zoom is set.

Figure 5:
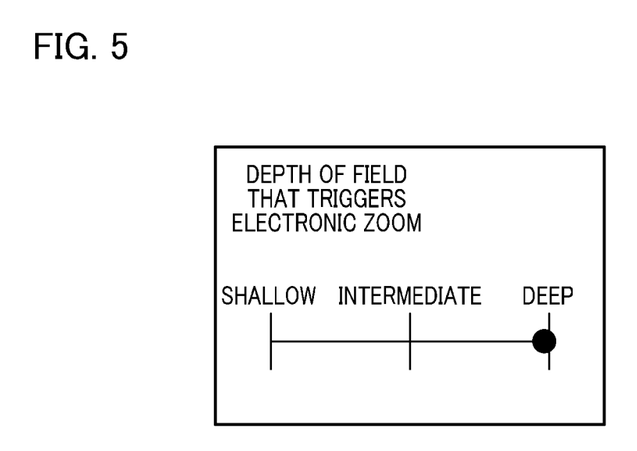
FIG. 5 is a drawing that shows an example of a setting for the depth of field that triggers electronic zooming.
Figure 6:
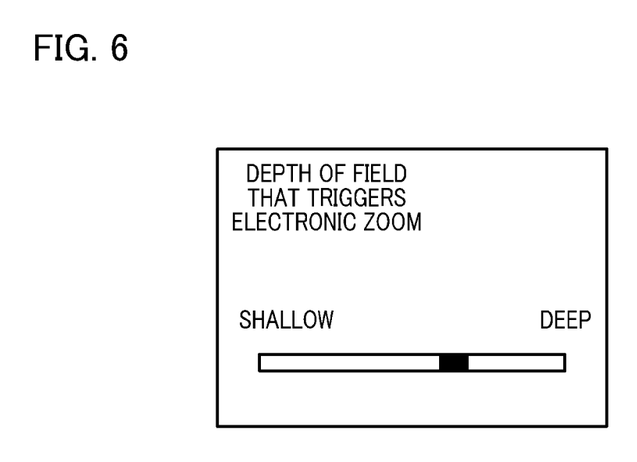
FIG. 6 is a drawing that shows another example of a setting for the depth of field that triggers electronic zooming.

FIG. 5 is a drawing that shows an example of the settings for the depth of field that triggers the electronic zoom. FIG. 6 is a drawing that shows an alternative example of the settings for the depth of field that triggers the electronic zoom. The depth of field is set, for example, to three stages, as shown in FIG. 5: shallow, deep, and intermediate. The stages of this setting may also be set to 5 stages, 7 stages, or 9 stages. In addition, as shown in FIG. 6, the stages of this setting may also be set in plural stages from shallow to deep. Returning to FIG. 4, in S206, the operation unit 70 is further operated to start the live view. In S207, the shutter button (not illustrated) is half-pressed to turn ON the shutter switch 62 (SW1), and focusing on the subject is carried out. In S208, the shutter button is completely pressed to turn the shutter switch 62 (SW2) ON, and it is determined whether the recording of the video image has started. When the recording of a video image has started, the processing proceeds to S209, and when the recording of the video image has not been started, the determination of S208 is repeated.

In S209, it is determined whether the operation of the zoom key of the operation unit 70 is being operated at the telescopic side. When the zoom key is operated at the telescopic side, the processing proceeds to S210, and when this is not the case, the determination of S209 is repeated. In S210, the depth of field calculating unit 50b calculates the depth of field. In S211, it is determined whether the depth of field that has been calculated in S210 is shallower than a specified depth of field. In the case in which the depth of field is not shallower than the specified depth of field, the processing moves to S212, and in the case in which it is not shallower, the processing proceeds to S213. In S212, because the depth of field is shallower than the specified depth of field, the optical zoom is switched to the electronic zoom to perform zooming. Thereby, zooming is always possible while the depth of field is deep. In S213, because the depth of field is not shallower than the specified depth of field, the optical zooming continues. In S214, it is determined whether the imaging has ended, and if the imaging has ended, the processing returns to S209. It is determined whether the zoom is operating at the telescopic side, and the same processing is repeated.

As explained above, according to the first embodiment, the depth of field calculating unit 50b calculates the depth of field, and when the depth of field that has been set by the result of this calculation is shallower than the specified depth of field, the zoom operation at the telescopic side is switched to the electronic zoom. Thus, a video can be recorded in which a depth of field is both deep and never out of focus.

Figure 7:
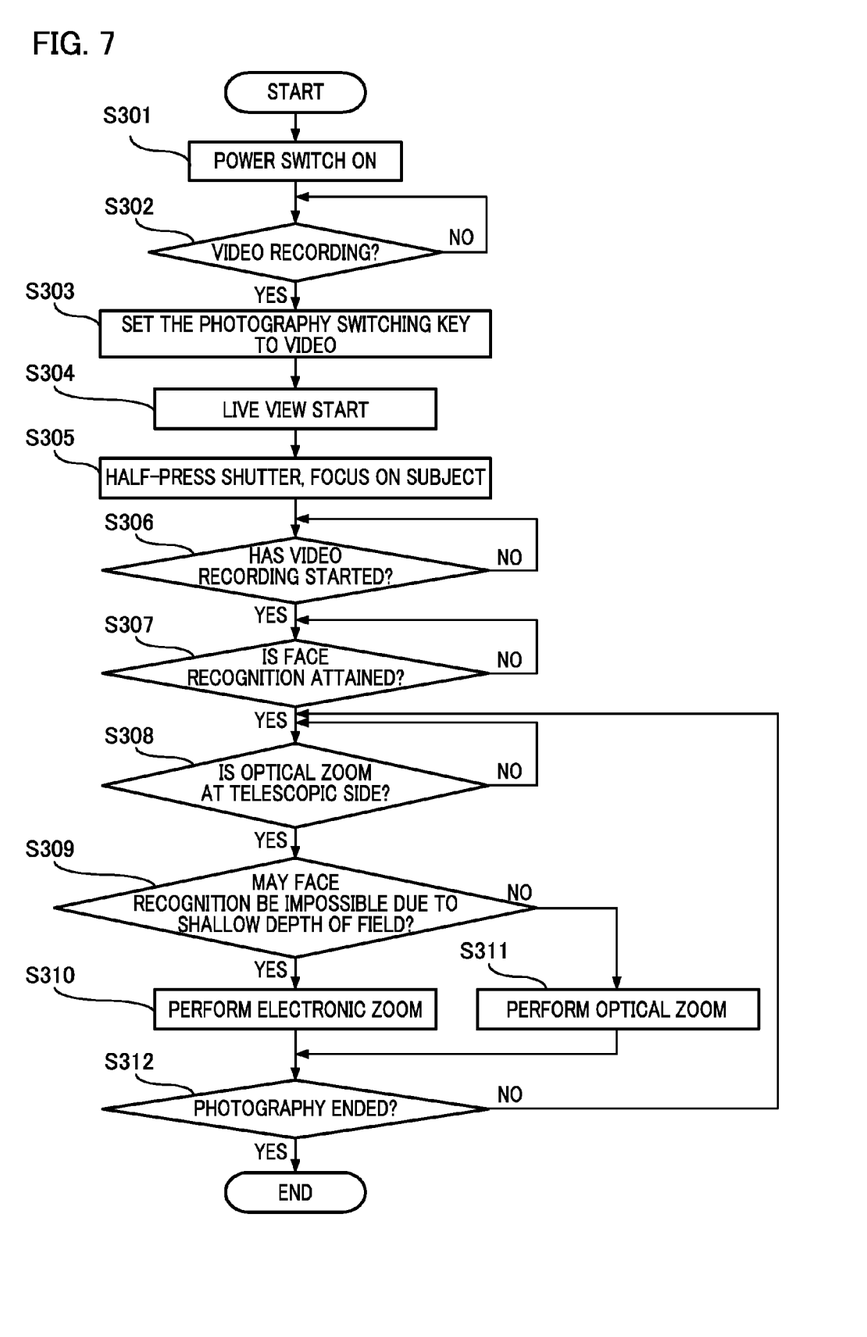
FIG. 7 is a flowchart that shows the operation of the imaging apparatus 100 of a second embodiment.

A second embodiment is described as follows. In the second embodiment, the operation of the imaging apparatus 100 differs from that of the first embodiment, and otherwise, the second embodiment is identical to the first embodiment. Thus, parts that have the same function as those of the first embodiment described above are indicated by identical reference numerals, and redundant explanations are appropriately omitted. FIG. 7 is a flowchart that shows the operation of the imaging apparatus 100 of the second embodiment. First, in S301, the power switch 72 for using the imaging apparatus 100 is turned ON. In S302, it is determined whether video recording is being carried out. In the case in which video recording is being carried out, the processing proceeds to S303, and in the case in which video recording is not being carried out, the determination of S303 is repeated. In S303, the photography switching key of the operation unit 70 for switching between still photography or video photography is switched to video photography. In S304, the operation unit 70 is operated to start live view. In S305, the shutter button (not illustrated) is half-pressed to turn the shutter switch 62 (SW1) ON, and focusing on the subject is carried out. In S306, the shutter button is completely pressed to turn the shutter switch 62 (SW2) ON, and it is determined whether the recording of a video image has started. If the recording of a video image has started, the processing proceeds to S307, and if video recording has not started, the determination of S306 is repeated. In S307, the image recognition unit 602 determines whether face recognition has been possible. If face recognition has been possible, the processing proceeds to S308, and if not, the determination of S307 is repeated. In S308, it is determined whether the operation of the zoom key of the operation portion 70 has been operated at the telescopic side. If the zoom key is being operated at the telescopic side, the processing proceeds to S309, and if possible, the determination of S308 is repeated.

Figure 8:
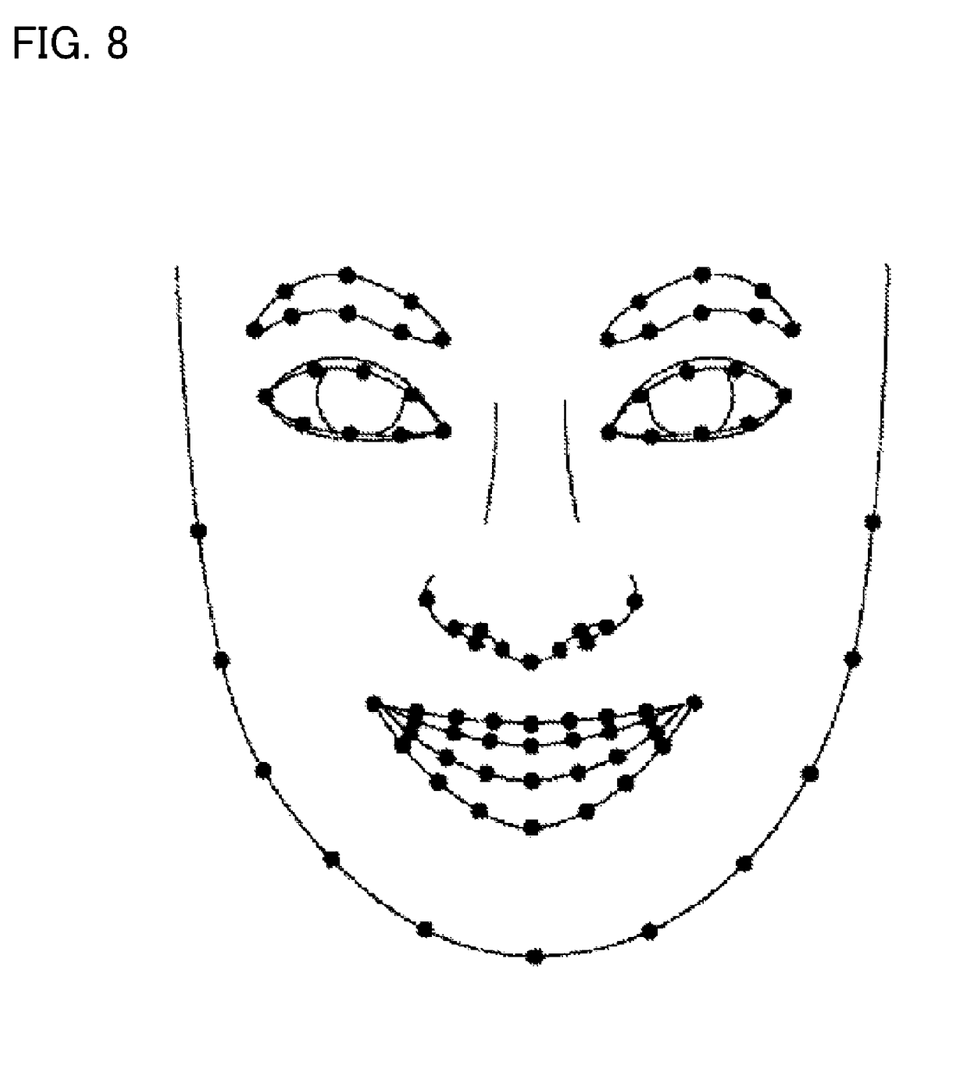
FIG. 8 is a drawing for explaining the characteristic points for performing facial recognition.

In S309, it is determined whether the depth of field becomes shallow due to setting the optical zoom to the telescopic side, and that face recognition may not be possible. In the case in which face recognition may not be possible, the processing proceeds to S310, and if not, the processing proceeds to S311. FIG. 8 is a drawing for explaining the characterizing points when carrying out face recognition. The image recognition unit 602 of the present embodiment carries out face recognition by extracting the characteristic points, which are shown in FIG. 8, from the image. In addition, in S309, it is determined whether face recognition may not be possible based on the number of these characteristic points that can be extracted. In addition, the determination carried out in S309 may be a comprehensive determination that takes into consideration whether the depth of field is shallow. By taking into consideration the depth of field, it is possible to more correctly determine whether the reason that the number of characteristic points that can be extracted has decreased is because the optical zoom has been set at the telescopic side. In S310, because the face recognition may not be possible, zooming is carried out by switching from optical zoom to electronic zoom. Thereby, zooming can be carried out in a state in which face recognition is always possible. In contrast, in S311, because face recognition may not be possible, optical zoom continues to be carried out. In S312, it is determined whether photography has completed. If photography has not completed, the processing returns to S308. It is determined whether the zoom operation is at the telescopic side, and identical processing is repeated.

As explained above, according to the second embodiment, when face recognition may not be possible, the optical zoom is switched to electronic zoom, and thus after being able to carry out face recognition one time, a video can be recorded in a state in which face recognition is always possible.

Figure 9:
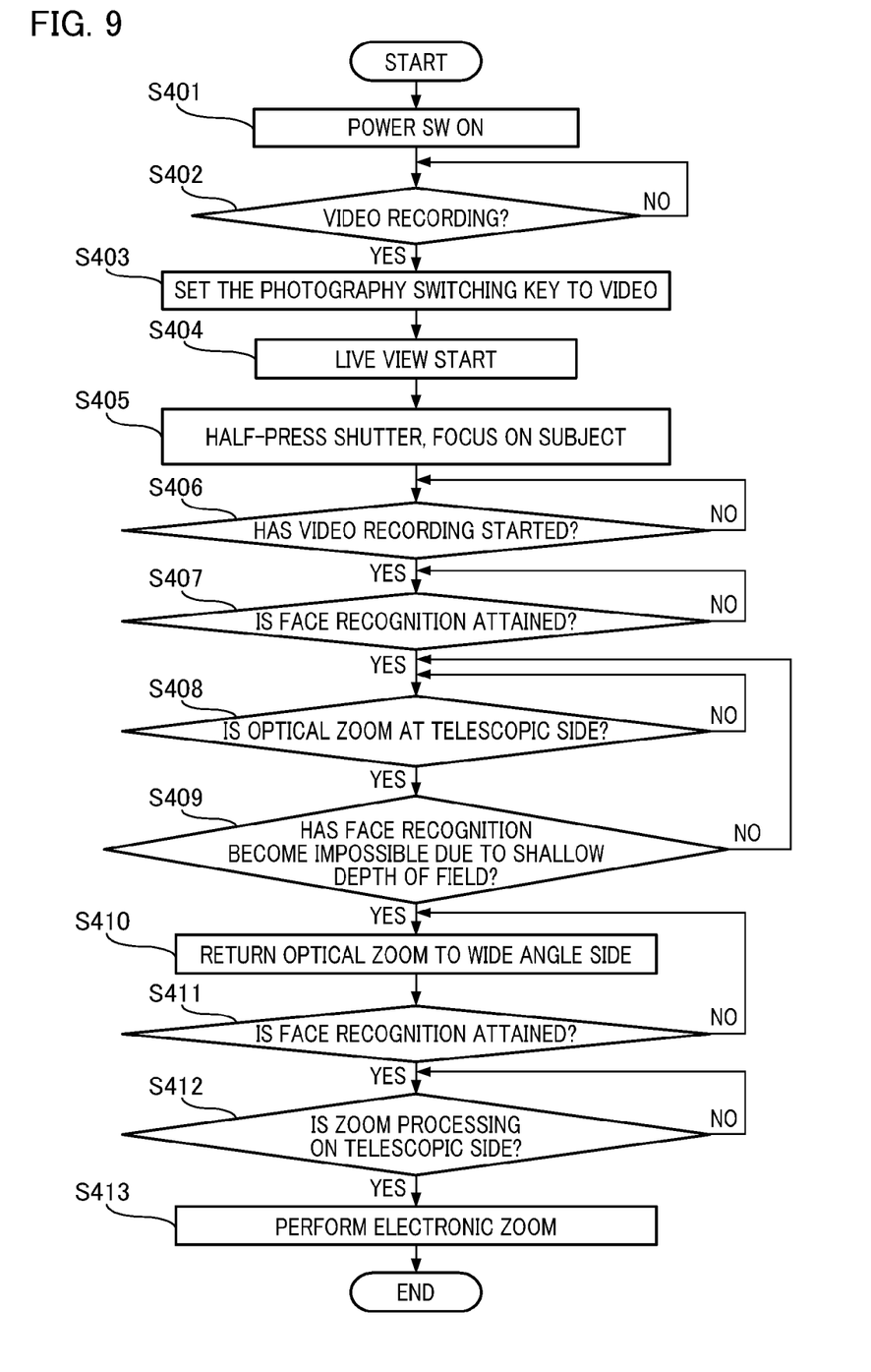
FIG. 9 is a flowchart that shows the operation of the imaging apparatus 100 of a third embodiment.

A third embodiment is described as follows. In the third embodiment, the operation of the imaging apparatus 100 differs from that of the second embodiment, and otherwise, the third embodiment is identical to the second embodiment. Thus, parts that have the same function as those of the second embodiment described above are indicated by identical reference numerals, and redundant explanations are appropriately omitted. FIG. 9 is a flowchart that shows the operation of the imaging apparatus 100 of the third embodiment. S401 to S408 are identical to S301 to S308 shown in FIG. 7 of the second embodiment, and the explanation thereof is omitted.

In S409, it is determined whether the depth of field is shallow, all characteristic point in FIG. 8 cannot be extracted, and face recognition is not possible due to the optical zoom being set to the telescopic side. In the case in which face recognition has become impossible, the processing proceeds to S410, and when this is not the case, the processing returns to S408. In S410, because face recognition has become impossible, the optical zoom is returned to the wide angle side. In S411, it is determined whether face recognition has again become possible. In the case in which face recognition has become possible, the processing proceeds to S412, and when this is not the case, the processing returns to S410. In S412, it is determined whether the zoom key of the operating unit 70 is being operated at the telescopic side. If the zoom key is being operated at the telescopic side, the processing proceeds to S413, and when this is not the case, the determination of S412 is repeated. In S413, zooming is carried out by electronic zoom.

As explained above, according to the third embodiment, when face recognition has become impossible, the optical zoom is returned to the wide angle side until face recognition becomes possible. In addition, when subsequently carrying out zooming at the telescopic side, because the optical zoom is switched to electronic zoom, after face recognition has been possible one time, video can be recorded in a state in which face recognition is always carried out.

Figure 10:
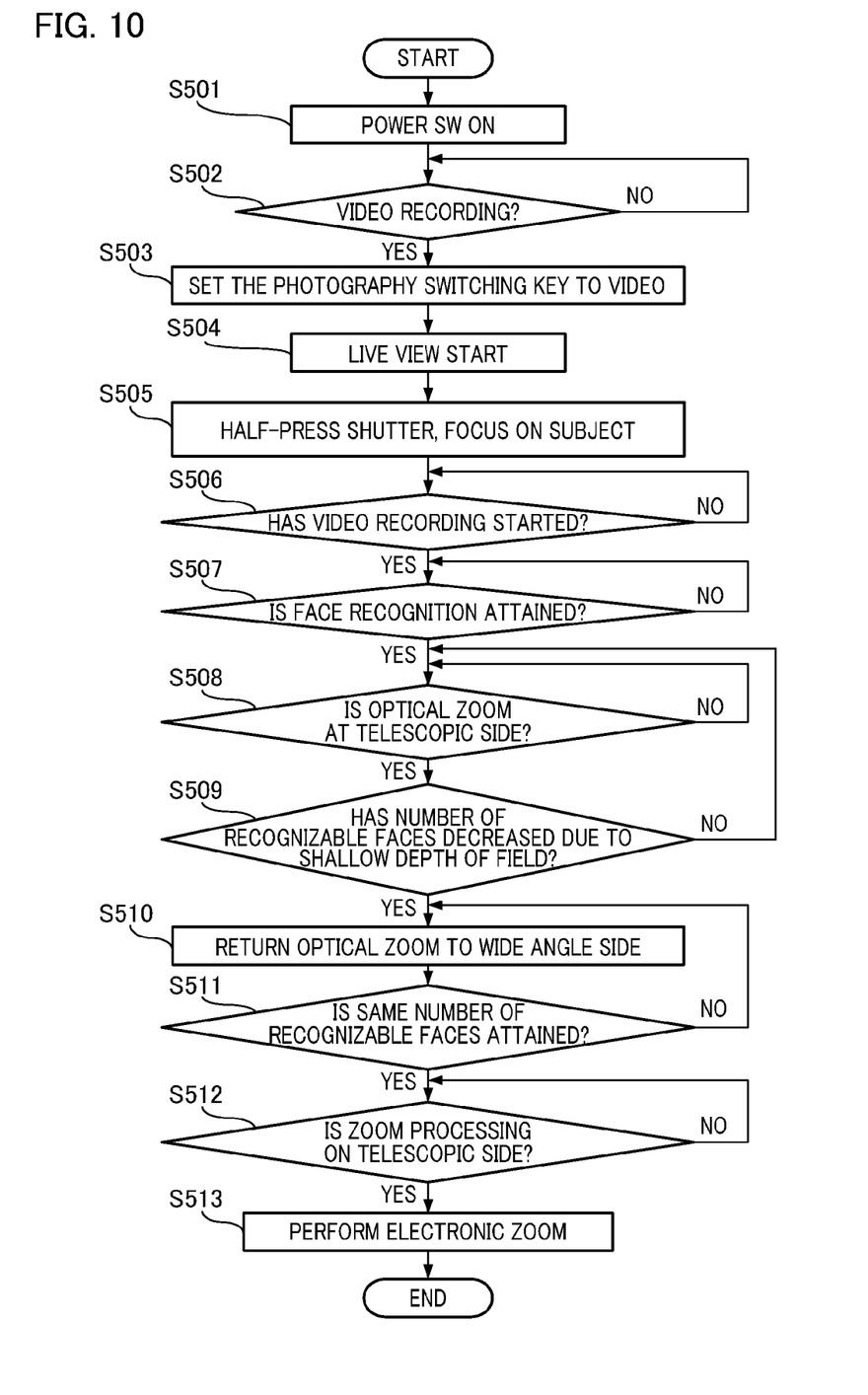
FIG. 10 is a flowchart that shows the operation of the imaging apparatus 100 of a fourth embodiment.

A fourth embodiment is described as follows. In the fourth embodiment, the operation of the imaging apparatus 100 differs from that of the second embodiment, and otherwise, the fourth embodiment is identical to the second embodiment. Thus, parts that have the same function as those of the second embodiment described above are indicated by identical reference numerals, and redundant explanations are appropriately omitted. FIG. 10 is a flowchart that shows the operation of the imaging apparatus 100 of the fourth embodiment. S501 to S508 are identical to S301 to S308 shown in FIG. 7 of the second embodiment, and the explanation thereof will be omitted.

Figure 11:
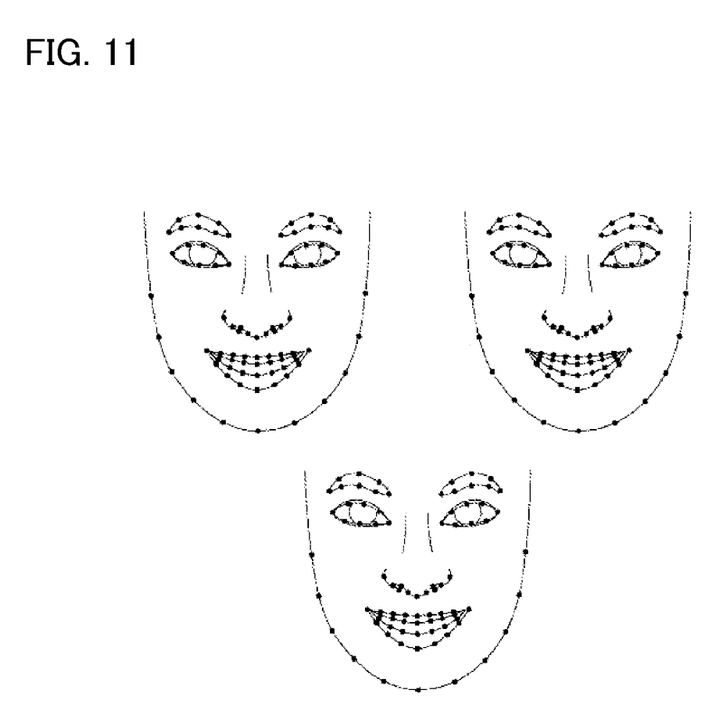
FIG. 11 is a drawing that shows the state in which plural faces are recognized.

In S509, it is determined whether the depth of field has become shallow and the number of faces that can be recognized has decreased due to the optical zoom being set at the telescopic side. FIG. 11 is a drawing that shows a state in which plural faces are recognized. As an example, the determination that the number of faces that can be recognized has decreased in S509 will be explained assuming the case in which, as shown in FIG. 11, the faces of three people are recognized. In this case, the depth of field has become shallow due to setting the optical zoom to the telescopic side, one person has become significantly out of focus, the characteristic points of the face of this person cannot be extracted, and the number of people whose faces can be recognized decreases. In this case, the result of the determination of S509 is YES.

Returning to FIG. 10, in the case in which the number of faces that can be recognized decreases according to the determination of S509, the processing proceeds to S510, and when this is not the case, the processing returns to S508. In S510, because the number of faces that can be recognized has decreased, the optical zoom returns to the wide angle side. In S511, it is determined whether face recognition of the same number of people can again be recognized as when face recognition was carried out in the previous S507. In the case in which recognition of the same number of faces has become possible, the processing proceeds to S512, and when this is not the case, the determination of S512 is repeated. In S512, it is determined whether the operation of the zoom key of the operation unit 70 is being operated at the telescopic side. If the zoom key is being operated at the telescopic side, the processing proceeds to S513, and when this is not the case, the determination of S512 is repeated. In S513, the zoom is carried out by electronic zooming.

As explained above, according to the third embodiment, when the number of faces that can be recognized has decreased, the optical zoom returns to the wide angle side until the number of faces that can be recognized is restored. In addition, when zooming is subsequently carried out at the telescopic side, the zoom switches to the electronic zoom, and thus video can be recorded once without the number of recognized faces decreasing.

In each of the embodiments, an example of a configuration in which the lens barrel 300 is interchangeable in the imaging apparatus 100. However, this is not limiting, and, for example, an imaging apparatus configured such that the lens barrel 300 is fixed to the imaging apparatus 100, and is not interchangeable may be used. Note that the first embodiment to the fourth embodiment and the modified configurations thereof can be used in suitable combinations, but the detailed explanation thereof is omitted.

According to the embodiments of the present invention that have been explained above, even in the case in which zooming is carried out at the telescopic side when carrying out video photography, an out of focus recording of the subject does not readily occur.

Other Embodiments

Aspects of the present invention can also be realized by a computer of a system or apparatus (or devices such as a CPU or MPU) that reads out and executes a program recorded on a memory device to perform the functions of the above-described embodiments, and by a method, the steps of which are performed by a computer of a system or apparatus by, for example, reading out and executing a program recorded on a memory device to perform the functions of the above-described embodiments. For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2008-312848 filed Dec. 9, 2008 which is hereby incorporated by reference herein in its entirety.

What is claimed is:

1. An imaging apparatus comprising:
    an imaging unit configured to capture a video of a subject image through a lens barrel;
    an instruction unit configured to instruct a trigger of focusing of a lens before a recording of the video starts;
    an optical zoom unit configured to move at least a portion of lenses that are included in the lens barrel and to change an angular field of the subject image that can be captured by the imaging unit;
    an electronic zoom unit configured to change a photographic range of a photographic image that has been obtained by the imaging unit by image processing;
    an obtaining unit configured to obtain a focal distance of a lens and a distance to a subject;
    a depth of field calculating unit configured to calculate a depth of field of a subject image that has been obtained through the lens barrel, wherein the depth of field calculating unit calculates the depth of field of the subject image after a focusing operation has been carried out based on the trigger of the focusing instructed by the instruction unit and after the recording of the video has started, and wherein the depth of field calculating unit calculates the depth of field of the subject image based on the focal distance of the lens and the distance to the subject obtained by the obtaining unit; and
    a control unit configured to switch between the optical zoom unit and the electronic zoom unit according to the depth of field that has been calculated by the depth of field calculating unit.

2. The imaging apparatus according to claim 1, wherein the control unit switches to using the electronic zoom unit in a zoom region in which the depth of field that has been calculated by the depth of field calculating unit is shallower than a preset depth of field.

3. The imaging apparatus according to claim 1, further comprising a photography conditions setting unit configured to set photography conditions, including at least a setting for an aperture value of the lens barrel,
    wherein the photography conditions setting unit carries out depth of field priority mode that sets the photography conditions such that the depth of field is deep.

4. The imaging apparatus according to claim 1, wherein the lens barrel is an interchangeable lens that is freely detachable from the imaging apparatus.

5. The imaging apparatus according to claim 1, wherein the control unit switches between the optical zoom unit and the electronic zoom unit according to whether or not the depth of field is shallower than a specified value.

6. A zoom control method for an imaging apparatus comprising:
    capturing, by an imaging unit, a video of a subject image through a lens barrel;

instructing, by an instruction unit, a trigger of focusing of a lens before a recording of the video starts;

moving, by an optical zoom unit, at least a portion of lenses that are included in the lens barrel and changing an angular field of the subject image that can be captured by the imaging unit;

changing, by an electronic zoom unit, a photographic range of a photographic image that has been obtained by the imaging unit;

obtaining, by an obtaining unit, a focal distance of the lens and a distance to a subject;

calculating, by a depth of field calculating unit, a depth of field of a subject image that has been obtained through the lens barrel, wherein the depth of field calculating unit calculates the depth of field of the subject image after the focusing operation has been carried out based on the trigger of the focusing instructed by the instruction unit and after the recording of the video has started, and wherein the depth of field calculating unit calculates the depth of field of the subject image based on the focal distance of the lens and the distance to the subject obtained by the obtaining unit; and switching, by a control unit, between the optical zoom unit and the electronic zoom unit according to the depth of field that has been calculated by the depth of field calculating unit.

* * * * *